(12) United States Patent
Kaku

(10) Patent No.: US 10,911,666 B2
(45) Date of Patent: Feb. 2, 2021

(54) IMAGING DEVICE, IMAGING SYSTEM, AND IMAGING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Daichi Kaku, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 23 days.

(21) Appl. No.: 16/356,633

(22) Filed: Mar. 18, 2019

(65) Prior Publication Data
US 2020/0084373 A1    Mar. 12, 2020

(30) Foreign Application Priority Data

Sep. 12, 2018  (JP) ................ 2018-170660

(51) Int. Cl.
| H04N 5/232 | (2006.01) |
| G02B 27/09 | (2006.01) |
| H04N 5/225 | (2006.01) |
| H04N 5/262 | (2006.01) |
| G01S 13/06 | (2006.01) |

(52) U.S. Cl.
CPC ..... H04N 5/23229 (2013.01); G02B 27/0955 (2013.01); H04N 5/2254 (2013.01)

(58) Field of Classification Search
CPC ............................ H04N 5/23229; G01S 13/06
See application file for complete search history.

(56) References Cited

U.S. PATENT DOCUMENTS

| 2004/0109199 A1* | 6/2004 | Tsubaki | H04N 1/0019 358/1.15 |
| 2008/0069449 A1 | 3/2008 | Cho et al. | |
| 2016/0148057 A1* | 5/2016 | Oh | H04N 7/183 348/143 |
| 2017/0186291 A1* | 6/2017 | Wenus | G01S 3/786 |
| 2018/0167150 A1* | 6/2018 | Clancy | H04B 17/27 |

FOREIGN PATENT DOCUMENTS

| JP | 2003018510 A | 1/2003 |
| JP | 2005086759 A | 3/2005 |
| JP | 2008099268 A | 4/2008 |

* cited by examiner

*Primary Examiner* — Christopher K Peterson
(74) *Attorney, Agent, or Firm* — Holtz, Holtz & Volek PC (57) ABSTRACT

An imaging device having an optical system according to an embodiment includes an imager, an information acquirer, and a processor. The imager captures an image via the optical system. The information acquirer acquires peculiar information transmitted from a peculiar information transmitter. The processor processes for associating the peculiar information and the image when the peculiar information transmitter is located within an imaging range of the optical system.

19 Claims, 9 Drawing Sheets

| PECULIAR INFORMATION TRANSMITTER | PECULIAR INFORMATION | ANGLE (Θ, Φ) | DISTANCE [m] | PHOTOGRAPHABLE ANGLE OF VIEW | ANGLE OF VIEW IN USE | DETERMINATION |
|---|---|---|---|---|---|---|
| h2 | 002 | (2, 20) | 40 | g22 | g26 | NOT WITHIN IMAGING RANGE |
| h4 | 004 | (11, 48) | 30 | g26 | g26 | WITHIN IMAGING RANGE |
| h6 | 006 | (12, 210) | 20 | g22, g24, g26, g28 | g28 | WITHIN IMAGING RANGE |
| h8 | 008 | (40, 320) | 6 | g30, g32 | g32 | WITHIN IMAGING RANGE |
| h10 | 0010 | (13, 95) | 35 | N/A | G22 | NOT WITHIN IMAGING RANGE (CHANGE IN ORIENTATION FOR PHOTOGRAPHING IS NECESSARY) |

IMAGING DEVICE, IMAGING SYSTEM, AND IMAGING METHOD

CROSS-REFERENCE TO RELATED APPLICATIONS

This application is based upon and claims the benefit of priority from Japanese Patent Application No. 2018-170660, filed on Sep. 12, 2018; the entire contents of which are incorporated herein by reference.

FIELD

An embodiment of the present invention relates to an imaging device, an imaging system, and an imaging method.

BACKGROUND

There is known a technique for, in order to efficiently retrieve an image captured by an imaging device, associating peculiar information with an object in the image. However, for general association processing, recognition processing and processing for, for example, specifying a target object according to a position and a posture of an imaging system are necessary. Therefore, processing for associating the peculiar information is complicated. It is likely that accuracy of the association processing is deteriorated.

DETAILED DESCRIPTION

An imaging device having an optical system according to an embodiment includes an imager, an information acquirer, and a processor. The imager captures an image via the optical system. The information acquirer acquires peculiar information transmitted from a peculiar information transmitter. The processor processes for associating the peculiar information and the image when the peculiar information transmitter is located within an imaging range of the optical system.

The embodiment of the present invention is explained below with reference to the drawings. The drawings do not always show actual sizes. For convenience, scales, dimension ratios, and the like are sometimes changed and shown as appropriate.

Embodiment

Figure 1:
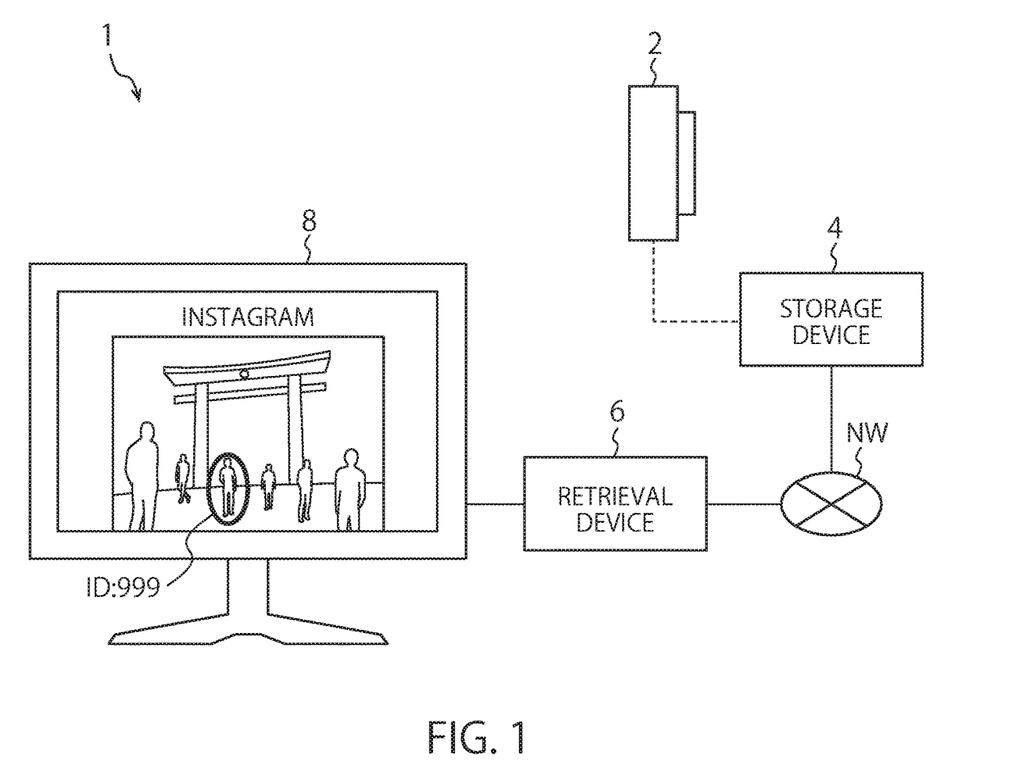
FIG. 1 is a diagram for explaining a configuration example of an imaging system according to an embodiment.

FIG. 1 is a diagram for explaining the configuration of an entire imaging system 1 according to an embodiment. As shown in FIG. 1, the imaging system 1 according to this embodiment is a system capable of retrieving a captured image of an object on the basis of peculiar information, for example, an ID (identification) given to the object. The imaging system 1 includes an imaging device 2, a storage device 4, a retrieval device 6, and a display device 8. In FIG. 1, the storage device 4 and the retrieval device 6 are connected via a network NW. The peculiar information is sometimes called as identification information.

Figure 2:
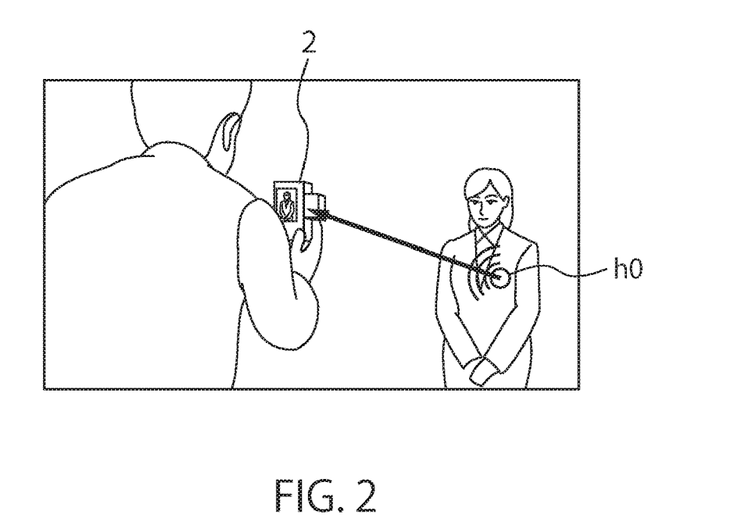
FIG. 2 is a diagram showing a state in which an object carrying a peculiar information transmitter is imaged by an imaging device.

FIG. 2 is a diagram showing a state in which an object (a person) having a peculiar information transmitter h0 is imaged by the imaging device 2. The imaging device 2 is, for example, a camera capable of receiving a radio wave signal or a sound wave signal transmitted by the peculiar information transmitter h0. The imaging device 2 images, for example, the object carrying the peculiar information transmitter h0. The object is not limited to the person and may be an object, an animal, a moving object such as a car, and the like. Alternatively, the object may be a fixed object that does not move. The imaging device 2 is capable of associating the peculiar information transmitted by the peculiar information transmitter h0 with a captured image.

The peculiar information transmitter h0 is, for example, a BLE (Bluetooth (registered trademark) Low Energy) beacon. A radio wave transmitted by the peculiar information transmitter h0 is in a band of, for example, 1 gigahertz or less. When the peculiar information transmitter h0 is a type for transmitting a sound wave signal, the peculiar information transmitter h0 has a GPS function and outputs a sound wave signal including position information and peculiar information. The radio wave transmitted by the peculiar information transmitter h0 may be in a sub-gigahertz band, a 2.4 gigahertz band, a BLE band, and a 5 gigahertz band.

The storage device 4 is, for example, a data server. The storage device 4 stores an image captured by the imaging device 2 and peculiar information associated with the image. The storage device 4 is connected to the network NW and capable of communicating via the network NW.

The retrieval device 6 is, for example, a personal computer. The retrieval device 6 retrieves an image in the storage device 4 using peculiar information as a retrieval keyword. The retrieval device 6 is connected to the network NW and capable of communicating with the storage device 4 via the network NW. The retrieval device 6 displays, for example, the peculiar information on the display device 8 together with an object in the image retrieved via the network NW.

The display device 8 is, for example, a monitor. The display device 8 displays the image retrieved by the retrieval device 6 using the peculiar information.

Figure 3:
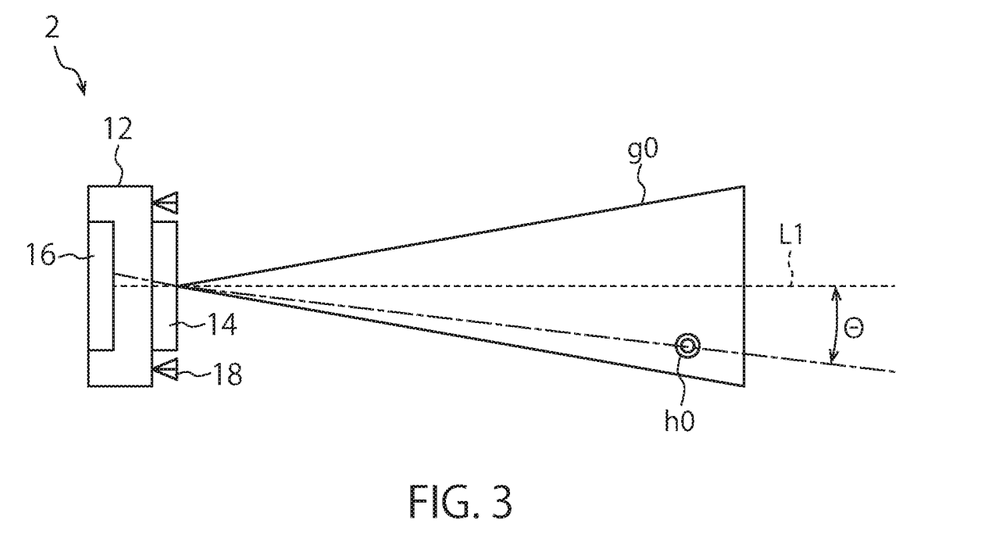
FIG. 3 is a diagram schematically showing the configuration of the imaging device.

FIG. 3 is a diagram (a view from the upper side) schematically showing a configuration example of the imaging device 2 and is a diagram for explaining a relation between the imaging device 2 and the peculiar information transmitter h0 carried by the object. As shown in FIG. 3, the imaging device 2 includes a main body section 12, an optical system 14 including a lens, an imager 16, and a plurality of antennas 18. In FIG. 3, the peculiar information transmitter h0, an angle of view g0 of the optical system 14, an optical axis center L1 of the optical system 14, and an angle θ of the peculiar information transmitter h0 with respect to the optical axis center L1 are shown.

When a wireless mode selection button (not shown in FIG. 3) is turned on, the imaging device 2 starts a photographing mode using radio wave signals received by the plurality of antennas 18. On the other hand, when the wireless mode selection button is turned off, the imaging device 2 starts a photographing mode without using the radio wave signals.

The main body section 12 includes, for example, a processor. The main body section 12 processes radio wave information received from the plurality of antennas 18 and generates an angle θ of the peculiar information transmitter h0 with respect to the optical axis center L1. The processor means a circuit such as a CPU (central processing unit). A detailed configuration of the main body section 12 is explained below.

The optical system 14 includes, for example, a zoom lens and is capable of mechanically changing a focal length and an angle of view. The optical system 14 can be replaced with, for example, a wide angle lens, a standard lens, a telephotographic lens, and a super telephotographic lens. Further, the optical system 14 may be configured by a plurality of lenses.

The imager 16 is, for example, a two-dimensional sensor. The imager 16 converts an optical image formed by the optical system 14 into image data. The image data is digital data capable of indicating a pixel position with two-dimensional coordinates.

Figure 4:
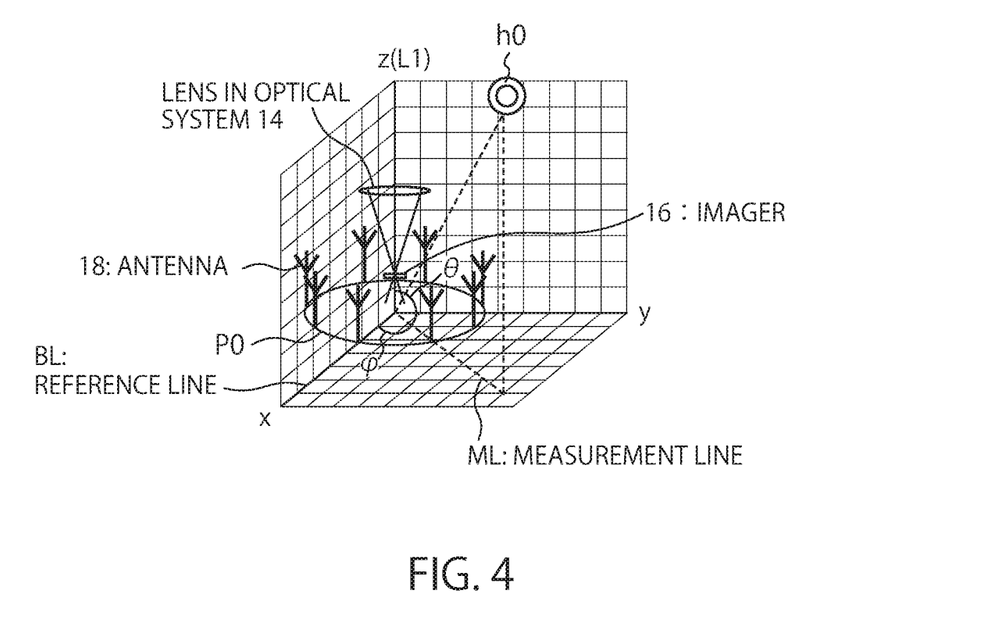
FIG. 4 is a diagram showing a disposition example of a plurality of antennas.

FIG. 4 is a diagram showing a disposition example of the plurality of antennas 18. In FIG. 4, the lens of the optical system 14 and the imager 16 are conceptually shown. As shown in FIG. 4, the plurality of antennas 18 are disposed on a circle centering on the optical axis center L1 of the optical system 14 on a plane P0 perpendicular to the optical axis center L1. The plane P0 is parallel to a light receiving surface of the imager 16. The plurality of antennas 18 receive radio wave signals transmitted by the peculiar information transmitter h0. By disposing the plurality of antennas 18 in this way, conversion of the peculiar information transmitter h0 into a first angle θ and a second angle φ with respect to the optical axis center L1 is simplified on the basis of the radio wave signals received by the plurality of antennas 18. In this way, the plurality of antennas 18 are disposed in a circular arrangement on a two-dimensional plane on three-dimensional lattice points.

A reference point is a base point of an angle present in the optical axis center L1. A reference line is a straight line perpendicular to the optical axis center L1 that passes the reference point. A reference plane is a plane perpendicular to the optical axis center L1 including the reference line. A measurement line is projection on the reference plane of a straight line that passes the reference point and the peculiar information transmitter h0. The first angle θ is an angle formed by the straight line, which passes the reference point and the peculiar information transmitter h0, with the optical axis. The second angle φ is an angle formed by the reference line and the measurement line. A distance L is a distance between the reference point and the peculiar information transmitter h0.

The first angle θ is an angle of a part from a predetermined position on the optical axis center L1 of the optical system 14 to the peculiar information transmitter h0 with respect to the optical axis center L1 of the optical system 14. The second angle φ is an angle between a measurement line ML, which passes the optical axis center L1 on the plane P0 perpendicular to the optical axis center L1 of the optical system 14, and a reference line BL (an X axis), which passes the optical axis center L1.

Figure 5:
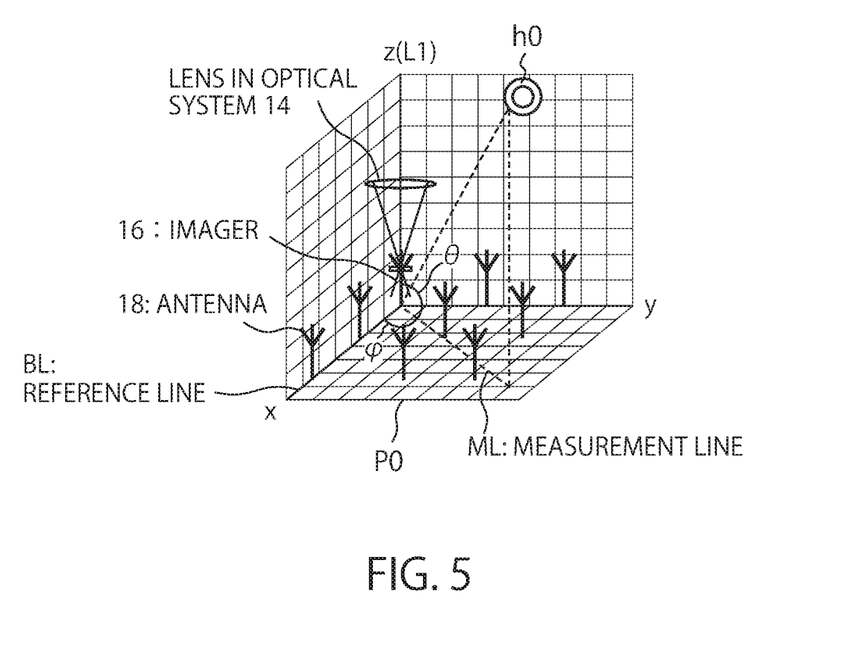
FIG. 5 is a diagram showing a disposition example of the plurality of antennas different from the disposition example shown in FIG. 4.

FIG. 5 is a diagram showing a disposition example of the plurality of antennas 18 different from the disposition example shown in FIG. 4. In FIG. 5, the lens of the optical system 14 and the imager 16 are conceptually shown. As shown in FIG. 5, the plurality of antennas 18 are disposed at vertexes of a predetermined rectangle on the plane P0 perpendicular to the optical axis center L1 of the optical system 14. By disposing the plurality of antennas 18 in this way, it is possible to more accurately convert the peculiar information transmitter h0 into the angle θ with respect to the optical axis center L1. In this way, the plurality of antennas 18 are disposed in a one-dimensional lattice point arrangement. In this way, the plurality of antennas 18 are disposed in a square arrangement on a two-dimensional plane on three-dimensional lattice points. Further, the arrangement of the plurality of antennas 18 are not limited to the one mentioned above and the plurality of antennas 18 may be disposed in a radial arrangement, or any other arrangement.

Figure 6:
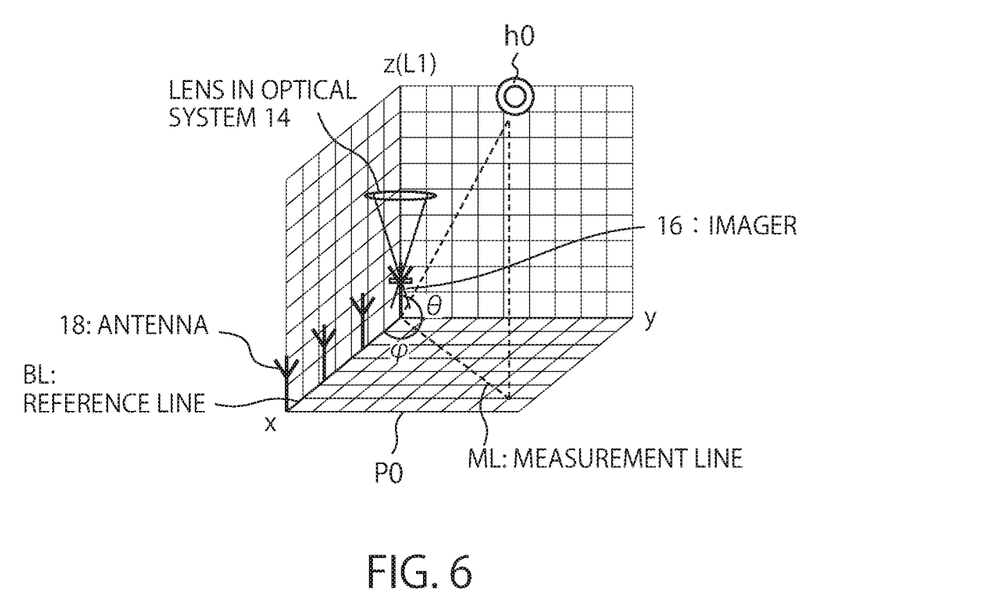
FIG. 6 is a diagram showing a different disposition example in which a plurality of antennas are disposed in a one-dimensional arrangement.

FIG. 6 is a diagram showing a different disposition example of a plurality of antennas 18 disposed in a one-dimensional arrangement. In FIG. 6, the lens of the optical system 14 and the imager 16 are conceptually shown. As shown in FIG. 6, the plurality of antennas 18 are disposed in one dimensional arrangement on the plane P0 perpendicular to the optical axis center L1 of the optical system 14. That is, the plurality of antennas 18 are disposed in a one-dimensional lattice point arrangement from the optical axis center L1. By disposing the plurality of antennas 18 in this way, it is possible to convert the peculiar information transmitter h0 into the angle θ with respect to the optical axis center L1 with a simpler configuration. Further, the arrangement of the plurality of antennas 18 are not limited to the one mentioned above and the plurality of antennas 18 may be disposed in a two-dimensional lattice point arrangement or a three-dimensional lattice point arrangement. In this way, the plurality of antennas 18 are disposed in any one of a circular arrangement centering on the optical axis center L1 on the plane perpendicular to the optical axis center of the optical system, a radial arrangement centering on the optical axis center, a one-dimensional lattice point arrangement from the optical axis center, and a three-dimensional lattice point arrangement centering on the optical axis center.

Figure 7:
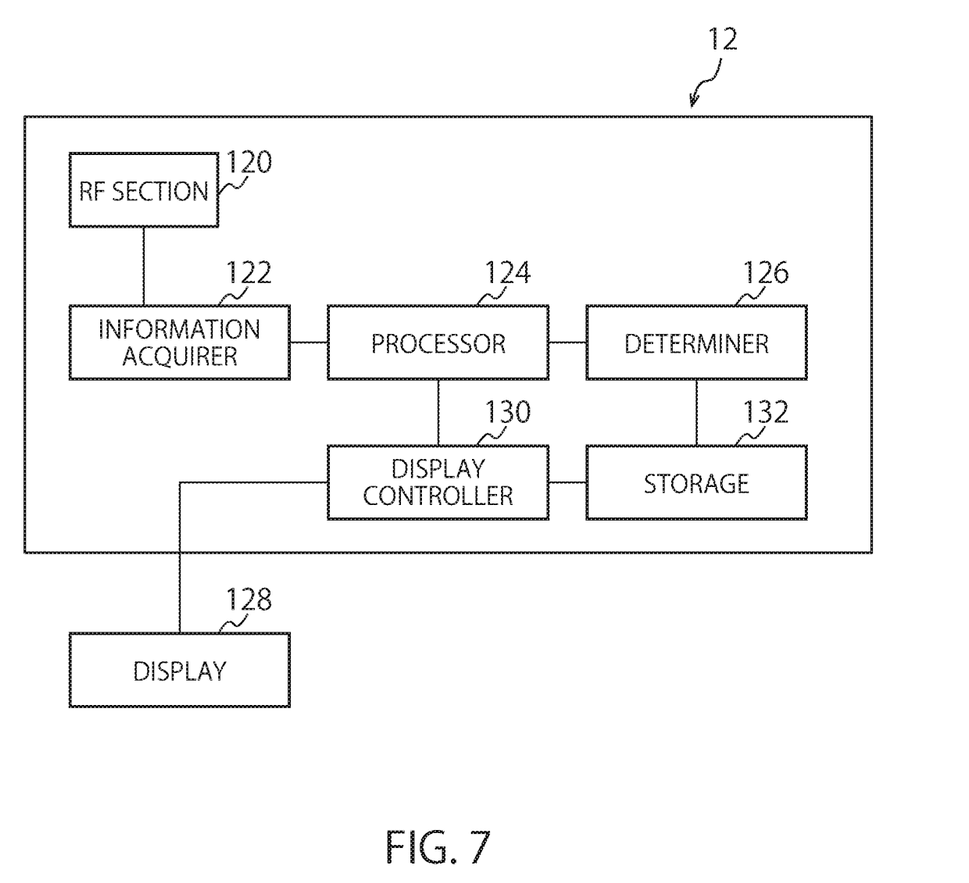
FIG. 7 is a block diagram showing the configuration of a main body section.

FIG. 7 is a block diagram showing the configuration of the main body section 12. As shown in FIG. 7, the main body section 12 includes an RF section 120, an information acquirer 122, a processor 124, a determiner 126, a display 128, a display controller 130, and a storage 132.

The RF section 120 converts radio wave signals respectively received by the plurality of antennas 18 into reception RF signals. The reception RF signals include peculiar information and phase information.

The information acquirer 122 acquires peculiar information of the peculiar information transmitter h0 included in the reception RF signals. The information acquirer 122 calculates a numerical value of AoA (Bluetooth Angle of Arrival) on the basis of a phase difference among the reception RF signals and generates information concerning the first angle θ (FIG. 4) with respect to the predetermined position on the optical axis center L1 (FIG. 4) of the optical system 14 and information concerning the second angle φ (FIG. 4) with respect to the plane perpendicular to the optical axis center L1 (FIG. 4) of the optical system 14. The predetermined position is, for example, the position of the lens center of the lens of the optical system 14 (FIG. 3). Further, the information acquirer 122 acquires distance information to peculiar information transmitters h2 to h10 on the basis of the intensity of radio waves transmitted by the peculiar information transmitters h2 to h10. A method of generating the information concerning the first angle θ (FIG. 4) and the information concerning the second angle φ (FIG. 4) is not limited to the numerical value calculation of AoA. A general position calculating method may be used. When the peculiar information transmitter h0 is a type for transmitting a sound signal, the information acquirer 122 generates the information concerning the first angle θ (FIG. 4) and the information concerning the second angle φ (FIG. 4) using position information included in a sound signal received by a not-shown sound receiver.

When the peculiar information transmitter h0 (FIG. 3) is located within an imaging range defined by the angle of view g0 (FIG. 3) of the optical system 14, the processor 124 performs processing for associating the peculiar information of the peculiar information transmitter h0 (FIG. 3) and an image captured by the imager 16 (FIG. 3). For example, the processor 124 associates the peculiar information and the image captured by the imager 16 (FIG. 3) and stores the peculiar information and the image in the storage 132.

Figure 8:
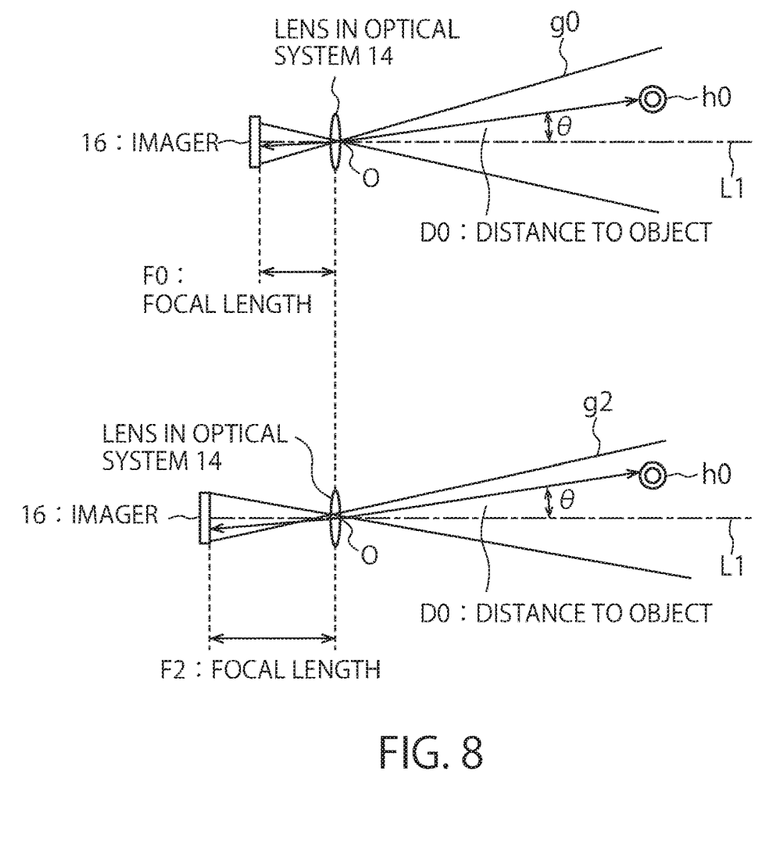
FIG. 8 is a diagram showing a relation between a first angle and a position on a light receiving surface of an imager.

FIG. 8 is a diagram showing a relation between the first angle θ and a position on the light receiving surface of the imager 16. A diagram on the upper side shows the relation in the case of the angle of view g0 and a focal length F0. A diagram on the lower side shows the relation in the case of an angle of view g2 and a focal length F2. As it is seen from these figures, when the angle of view is changed from g0 to g2 (<g0), the focal length of the optical system 14 is changed from F0 to F2 (>F0). On the other hand, the first angle θ with respect to the optical axis center L1 in the lens center 0 of the lens of the optical system 14 does not change. Therefore, the position of the peculiar information transmitter h0 on the light receiving surface in the imager 16 is changed according to the focal length.

Figure 9:
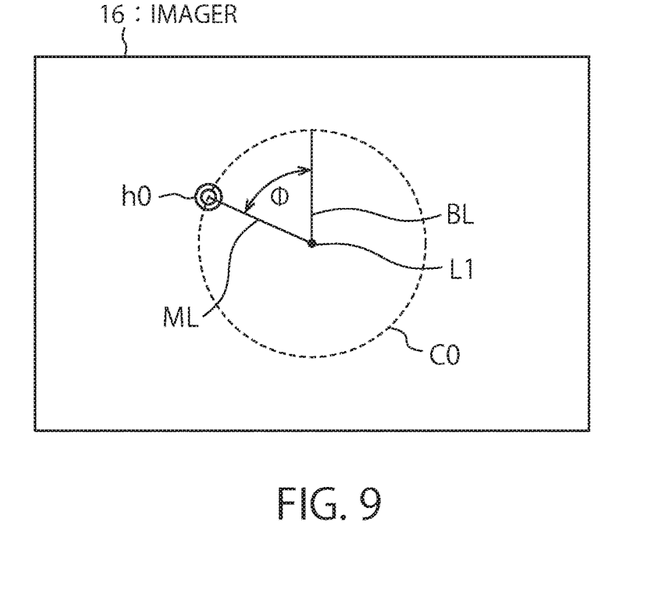
FIG. 9 is a diagram schematically showing the position of the peculiar information transmitter on the light receiving surface in the imager.

FIG. 9 is a diagram schematically showing the position of the peculiar information transmitter h0 on the light receiving surface in the imager 16. A radius d of a circle C0 centering on the optical axis center L1 is defined on the basis of the focal lengths F0 and F2 (FIG. 8) of the optical system 14 and the first angle θ (FIG. 8). That is, as the focal length is longer, the radius d is larger. In this way, the position of the peculiar information transmitter h0 on the light receiving surface in the imager 16 is on a circle having the radius d defined on the basis of the focal lengths F0 and F2 (FIG. 8) of the optical system 14 and the first angle θ (FIG. 8). In this way, the processor 124 performs, on the basis of the information concerning the first angle θ (FIG. 8) generated by the information acquirer 122, processing for associating the position information and the peculiar information of the peculiar information transmitter h0 in the image captured by the imager 16. For example, the processor 124 associates information concerning the circle having the radius d centering on the optical axis center L1 and the peculiar information of the peculiar information transmitter h0. More in detail, the processor 124 associates coordinates of the optical axis center L1 in the image, the radius d, and the peculiar information of the peculiar information transmitter h0 and stores the coordinates, the radius d, and the peculiar information in the storage 132. Consequently, the peculiar information transmitted by the peculiar information transmitter h0 is stored in association with the radius d centering on the optical axis center L1 in the image.

As explained above, the second angle φ generated by the information acquirer 122 indicates an angle of the measurement line d, which passes the optical axis center L1 on the plane perpendicular to the optical axis center L1, with respect to the reference line BL, which passes the optical axis center L1. As it is seen from these figures, it is possible to acquire two-dimensional coordinates of the peculiar information transmitter h0 on the light receiving surface in the imager 16 by using the information concerning the second angle φ as well.

In this way, the processor 124 associates, on the basis of the first angle θ and the second angle φ, two-dimensional coordinates (x, y) of the peculiar information transmitter h0 in the image and the peculiar information of the peculiar information transmitter h0. For example, the processor 124 associates the two-dimensional coordinates (x, y) of the peculiar information transmitter h0 in the image and the peculiar information of the peculiar information transmitter h0 and stores the two-dimensional coordinates (x, y) and the peculiar information in the storage 132. Consequently, the peculiar information transmitted by the peculiar information transmitter h0 is stored in association with the two-dimensional coordinates (x, y) in the image.

Besides the peculiar information and the two-dimensional coordinates (x, y), the processor 124 may associate the distance information to the peculiar information transmitter h0 with the image and store the distance information and the image in the storage 132. Alternatively, the processor 124 may record, in a header region of image data, information of at least the peculiar information of the peculiar information transmitter h0 among the peculiar information of the peculiar information transmitter h0, the two-dimensional coordinates (x, y) in the image, and the distance information.

Figure 10:
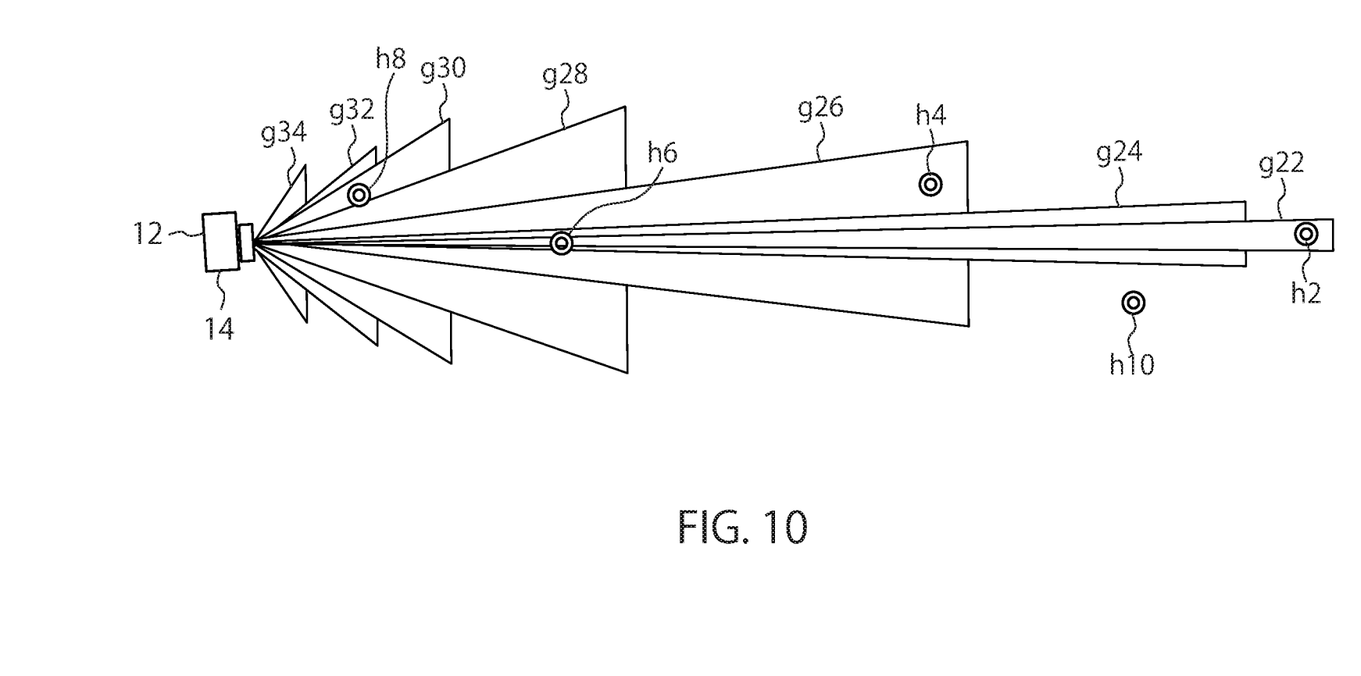
FIG. 10 is a horizontal plan view showing an example of an angle of view of an optical system.

FIG. 10 is a horizontal plan view showing an example of an angle of view of the optical system 14 of the imaging device 2. Each of g22 to g34 indicates an imaging range at each angle of view. The peculiar information transmitters h2 to h10 indicate examples of positions of peculiar information transmitters. As shown in FIG. 10, the imaging range is defined in advance according to an optical characteristic of an angle of view in the lens used by the optical system 14. In FIG. 10, the angle of view is discretely changed. However, the angle of view may be continuously changed. It is possible to grasp, according to the first angle θ (FIG. 8) generated by the information acquirer 122 and distance information to the peculiar information transmitters h2 to h10, in which positions of the horizontal plan view the peculiar information transmitters h2 to h10 are present.

The determiner 126 determines, on the basis of the first angle θ (FIG. 8) generated by the information acquirer 122, the distance information to the peculiar information transmitters h2 to h10, and information concerning an angle of view used for imaging, whether the peculiar information transmitters h2 to h10 are positioned within imaging ranges. When the determiner 126 determines that the peculiar information transmitters h2 to h10 are positioned within the imaging ranges of the optical system 14, the processor 124 may perform processing for associating the peculiar information of the peculiar information transmitters h2 to h10 and the image.

The determiner 126 outputs, on the basis of the first angle θ (FIG. 8) generated by the information acquirer 122 and the distance information to the peculiar information transmitters h2 to h10, information concerning angles of view at which the peculiar information transmitters h2 to h10 can be imaged.

Figure 11:
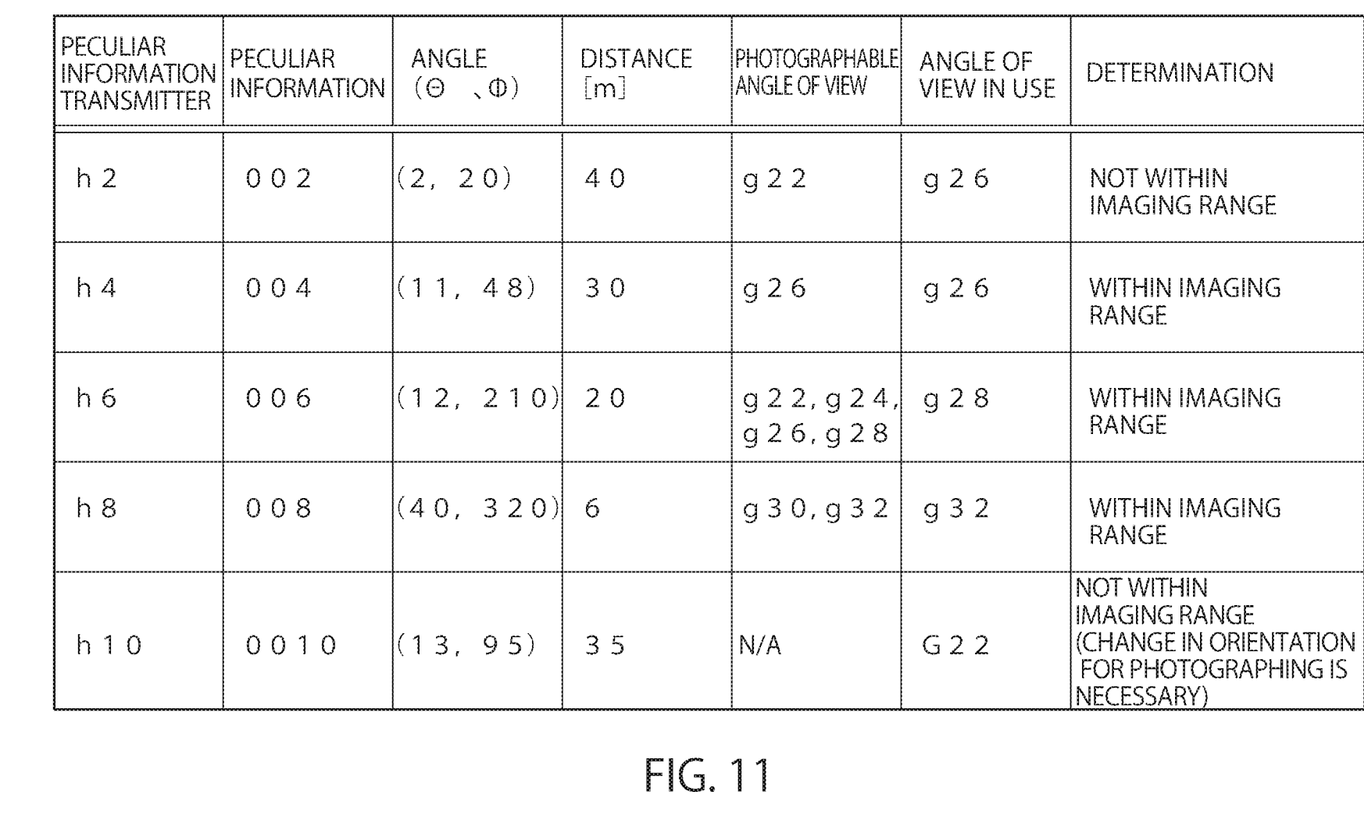
FIG. 11 is a diagram showing a determination example of a determiner.

FIG. 11 is a diagram showing a determination example of the determiner 126. In FIG. 11, peculiar information, an angle, a distance, and an angle of view in use are information generated or acquired by the information acquirer 122 (FIG. 7). A photographable angle of view and determination are information output by the determiner 126.

Referring to FIG. 10, for example, in the case of the peculiar information transmitter h2 present in the most distant position from the imaging device 2, since the peculiar information transmitter h2 is present within the imaging range of the angle of view g22, the determiner 126 outputs a signal including information indicating the angle of view g22, as the photographable angle of view. Similarly, in the case of the peculiar information transmitter h4 present in a position closer to the imaging device 2 side than the peculiar information transmitter h2, since the peculiar information transmitter h4 is present within the imaging range of the angle of view g26, the determiner 126 outputs a signal including information indicating the angle of view g26, as the photographable angle of view. Similarly, in the case of the peculiar information transmitter h6 present in a position closer to the imaging device 2, since the peculiar information transmitter h6 is present within the imaging ranges of the angles of view g22, g24, g26, and g28, the determiner 126 outputs a signal including information indicating the angles of view g22, g24, g26, and g28, as the photographable angles of view. Similarly, in the case of the peculiar information transmitter h8 present in a position closest to the imaging device 2, since the peculiar information transmitter h8 is present within the imaging ranges of the angles of view g30 and g32, the determiner 126 outputs a signal including information indicating the angles of view g30 and g32, as the photographable angles of view. On the other hand, in the position of the peculiar information transmitter h10, since an angle of view within the imaging range is absent, the determiner 126 outputs a signal including information indicating that the photographable angle of view, which should be set as a candidate target, is absent.

For example, in the case of the peculiar information transmitter h2, since the angle of view in use g26 is not included in the photographable angle of view g22, the determiner 126 outputs, as a determination result, a signal including information indicating "not within" the imaging range. Similarly, in the case of the peculiar information transmitter h4, since the angle of view in use g26 is included in the photographable angle of view g26, the determiner 126 outputs, as a determination result, a signal including information indicating "within" the imaging range. Similarly, in the case of the peculiar information transmitter h6, since the angle of view in use g28 is included in the photographable angles of view g22, g24, g26, and g28, the determiner 126 outputs, as a determination result, a signal including information indicating "within" the imaging range. Similarly, in the case of the peculiar information transmitter h8, since the angle of view in use g32 is included in the photographable angles of view g30 and g32, the determiner 126 outputs, as a determination result, a signal including information indicating "within" the imaging range. On the other hand, since an angle of view at which the peculiar information transmitter h10 can be photographed is absent, the angle of view in use g32 is not included in the photographable angle of view. Therefore, the determiner 126 outputs, as a determination result, a signal including information indicating "not within" the imaging range.

As shown in FIG. 7, the display 128 is, for example, a liquid crystal monitor. The display 128 is disposed on a surface of the main body section 12 (FIG. 3) opposed to the optical system 14. An image captured by the imager 16 and various kinds of information are displayed on the display 128.

The display controller 130 causes the display 128 to display the image captured by the imager 16 and the various kinds of information.

Figure 12:
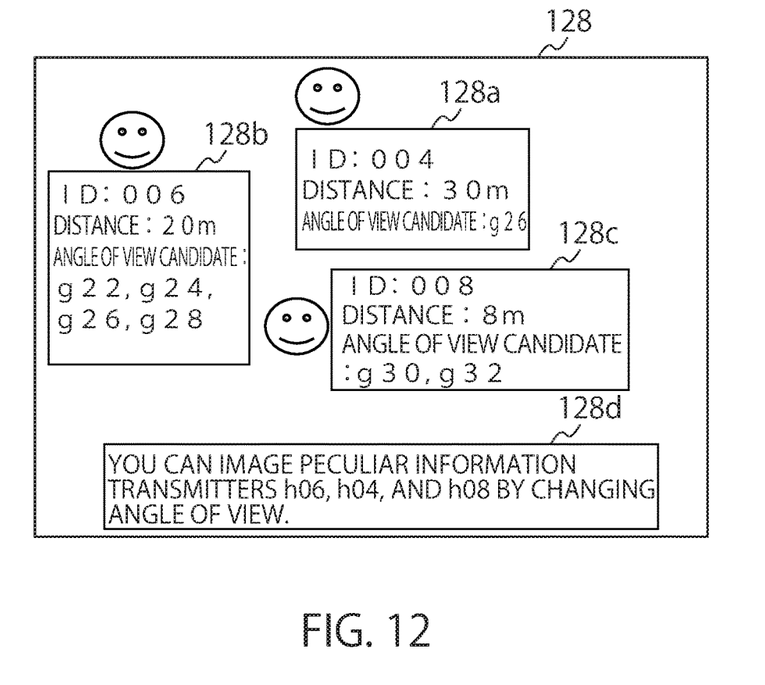
FIG. 12 is a diagram showing an example of information displayed on a display by a display controller before imaging.

FIG. 12 is a diagram showing an example of information displayed on the display 128 by the display controller 130 before imaging. Display forms 128a to 128c show marks indicating information and positions of peculiar information transmitters that can be imaged. A display form 128d shows a message output by the determiner. For example, an image displayed on the display 128 is an image preliminarily photographed at the maximum angle of view g34 (FIG. 10).

As shown in FIG. 12, the display controller 130 displays, using information output by the determiner 126, information concerning peculiar information transmitters that can be photographed at a maximum angle of view of the optical system 14. Consequently, a photographer can confirm that peculiar information transmitters that transmit peculiar information (IDs) 004, 006, and 008 are present in the present photographing direction of the imager 16. The photographer can learn appropriate angles of view for imaging the peculiar information transmitters that transmit the peculiar information (IDs) 004, 006, and 008.

Figure 13:
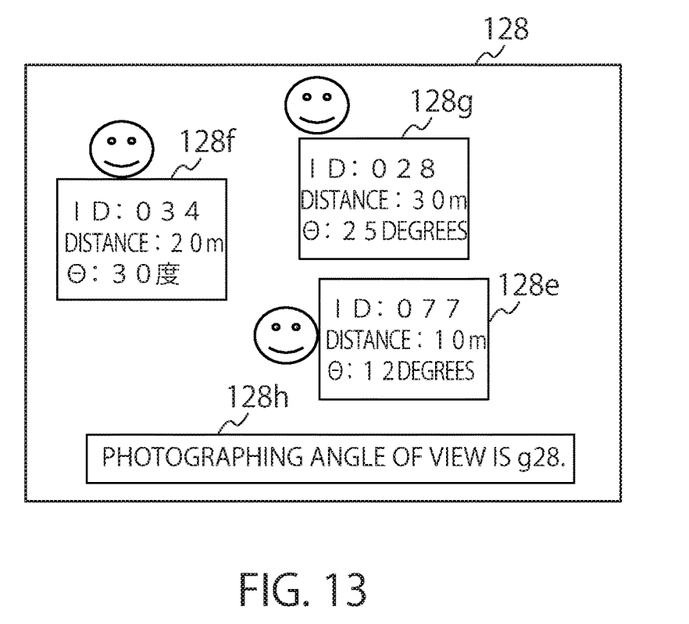
FIG. 13 is a diagram showing an example of information displayed on the display together with a captured image by the display controller.

FIG. 13 is a diagram showing an example of information displayed on the display 128 by the display controller 130 together with a captured image. Display forms 128e to 128g show marks indicating information and positions of peculiar information transmitters in the captured image. That is, face marks correspond to positions of the peculiar information transmitters in the image. A display form 128f shows a message output by the information acquirer 122.

As shown in FIG. 13, the display controller 130 displays, on the display 128, together with an image, information concerning peculiar information transmitters present within an imaging range of an imaging angle of view used for photographing. Consequently, the photographer can grasp, in a captured image, positions of peculiar information transmitters h034, h028, and h077 that transmit peculiar information 034, 028, and 077. As shown in FIG. 10, the display controller 130 may display, on the display 128, the diagram showing the positions of the peculiar information transmitters with respect to the angles of view. As shown in FIG. 11, the display controller 130 may display, on the display 128, the information concerning the peculiar information transmitters in a table format.

The storage 132 is realized by a semiconductor memory such as a RAM (random access memory) or a flash memory, a hard disk, or the like. The storage 132 stores computer programs executed by the main body section 12 and various data for control. That is, the main body section 12 executes the computer programs, whereby the functions of the RF section 120, the information acquirer 122, the processor 124, the determiner 126, and the display controller 130 are realized.

The configuration of the imaging system 1 according to this embodiment is as explained above. An operation example of the imaging system 1 is explained.

Figure 14:
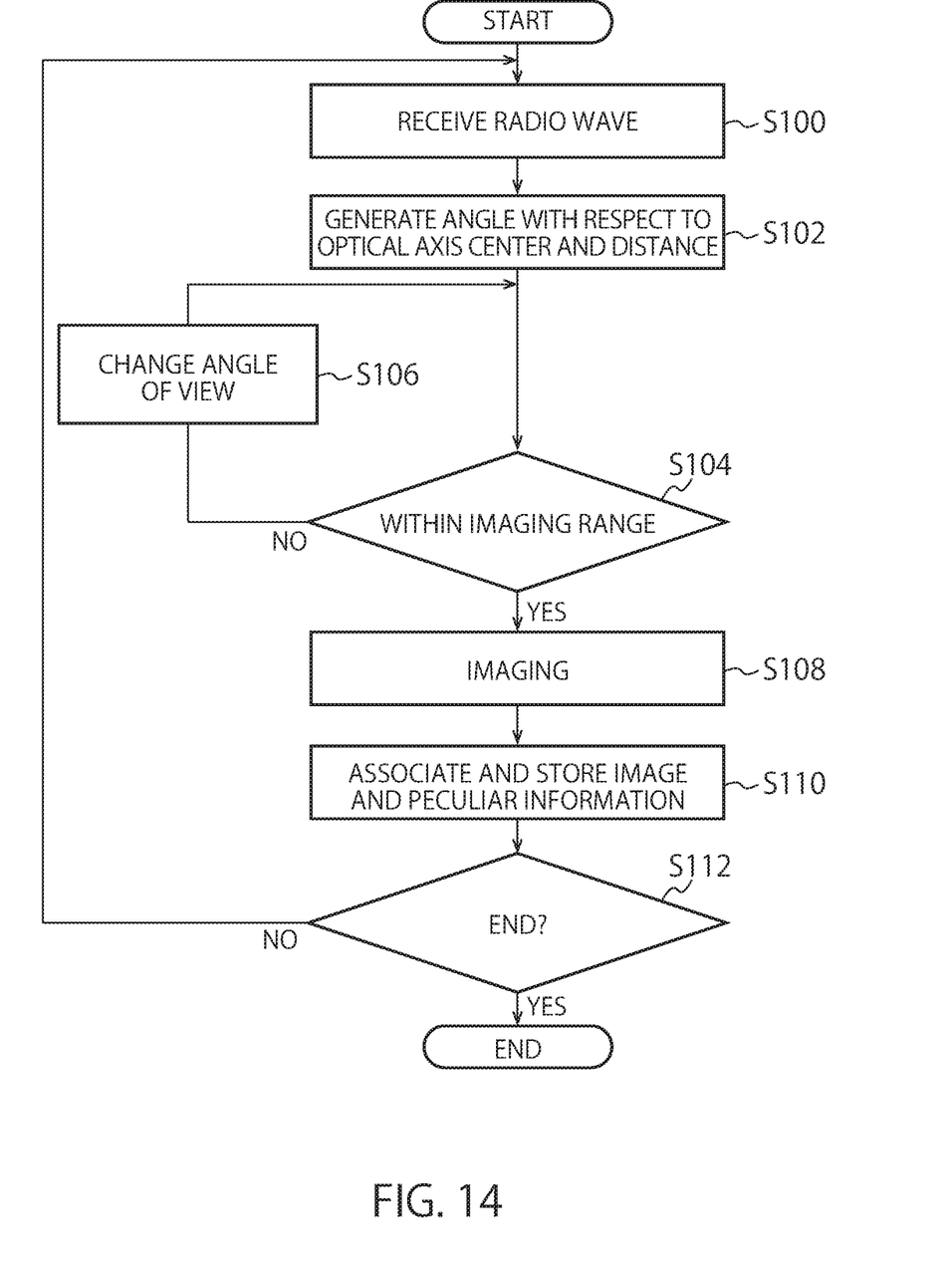
FIG. 14 is a flowchart for explaining an operation example of the imaging system.

FIG. 14 is a flowchart for explaining the operation example of the imaging system 1. As shown in FIG. 14, the plurality of antennas 18 receive radio wave signals transmitted by a peculiar information transmitter (step S100).

Subsequently, the information acquirer 122 generates, using information of the radio wave signals received by the plurality of antennas 18, information concerning the angle θ of the peculiar information transmitter with respect to the optical axis center L1 of the optical system 14 and distance information to the peculiar information transmitter (step S102).

Subsequently, the determiner 126 determines, on the basis of the information concerning the angle θ and the distance information, whether imaging of the target peculiar information transmitter is possible at the present angle of view of the optical system 14 (step S104). When the imaging of the peculiar information transmitter is impossible (NO in step S104), the determiner 126 displays, on the display 128, via the display controller 130, information concerning an angle of view at which the imaging of the target peculiar information transmitter is possible. Subsequently, the operator changes the present angle of view to the angle of view at which the target peculiar information transmitter is possible (step S106) and repeats the processing from step S104.

On the other hand, when the imaging of the peculiar information transmitter is possible (YES in step S104), the operator performs imaging with the imaging device 2 (step S108). Subsequently, the processor 124 associates a captured image and peculiar information transmitted by the peculiar information transmitter and stores the image and the peculiar information in the storage 132 (step S110).

The information acquirer 122 determines whether the photographing mode using radio wave signals is continued or not (step S112). When the photographing mode is continued (NO in step S112), the information acquirer 122 repeats the processing from step S100. On the other hand, when the photographing mode is not continued (YES in step S112), the information acquirer 122 ends the entire processing.

As explained above, according to this embodiment, the information acquirer 122 acquires the peculiar information transmitted from the peculiar information transmitter. The processor 124 performs the processing for associating the peculiar information of the peculiar information transmitter located within the imaging range of the optical system 14 and the captured image. Consequently, by disposing the peculiar information transmitter within the imaging range of the optical system 14 and imaging the peculiar information transmitter, it is possible to associate the captured image and the peculiar information transmitted by the peculiar information transmitter.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An imaging device having an optical system, the imaging device comprising:
   an imager configured to capture an image via the optical system;
   a plurality of antennas disposed in association with an optical axis center of the optical system, and configured to receive radio wave signals transmitted from a peculiar information transmitter;
   an information acquirer configured to acquire peculiar information included in the radio wave signals, and further configured to generate measurement information indicating a position of the peculiar information transmitter with respect to the optical axis center of the optical system based on information of the radio wave signals;
   a determiner configured to determine, based on the measurement information and an angle of view used for imaging the peculiar information transmitter, whether the peculiar information transmitter is positioned within an imaging range of the optical system; and
   a processor configured to perform processing for associating the peculiar information with the image when the determiner determines that the peculiar information transmitter is positioned within the imaging range of the optical system.

2. The imaging device according to claim 1, wherein the processor is further configured to, based on the measurement information, perform processing for associating position information with the peculiar information of the peculiar information transmitter in the image captured by the imager.

3. The imaging device according to claim 1, wherein:
   the information acquirer is configured to generate, as the measurement information, information concerning a first angle of a part from a predetermined position on the optical axis center of the optical system to the peculiar information transmitter with respect to the optical axis center of the optical system and information concerning a second angle between a measurement line, which passes the optical axis center on a plane perpendicular to the optical axis center of the optical system, and a reference line, which passes the optical axis center, and
   the processor is configured to associate two-dimensional coordinates in the image and the peculiar information based on the measurement information.

4. The imaging device according to claim 1, wherein the measurement information includes at least a first angle among the first angle formed by a straight line, which passes a reference point present on the optical axis center of the optical system and the peculiar information transmitter, with the optical axis center, a second angle that is an angle of a reference line perpendicular to the optical axis center, which passes the reference point, and a measurement line that projects on a reference plane of the straight line, which passes the reference point and the peculiar information transmitter, and a distance from the reference point to the peculiar information transmitter.

5. The imaging device according to claim 4, wherein the determiner further outputs, based on information concerning the distance and the first angle, information concerning an angle of view at which the peculiar information transmitter is imaged.

6. The imaging device according to claim 1, further comprising a storage configured to store information associated with the image by the processor and the image.

7. The imaging device according to claim 6, wherein the information associated with the image includes at least the peculiar information among the peculiar information, two-dimensional coordinates of the peculiar information transmitter on the image, and a distance to the peculiar information transmitter.

8. The imaging device according to claim 1, wherein the plurality of antennas are disposed in a form of any one of a circular arrangement centering on the optical axis center on a plane perpendicular to the optical axis center of the optical system, a radial arrangement centering on the optical axis center, a one-dimensional lattice point arrangement from the optical axis center, and a three-dimensional lattice point arrangement centering on the optical axis center.

9. The imaging device according to claim 1, further comprising a display controller configured to display, on a display, the peculiar information of the peculiar information transmitter together with the image.

10. The imaging device according to claim 1, wherein a radio wave transmitted by the peculiar information transmitter is in any band of 1 gigahertz or less, 2.4 gigahertz, and 5 gigahertz.

11. The imaging device according to claim 1, wherein the information acquirer acquires the peculiar information and position information included in a sound wave signal transmitted by the peculiar information transmitter.

12. An imaging system comprising:
the imaging device according to claim 1; and
a peculiar information transmitter configured to transmit the peculiar information.

13. The imaging system according to claim 12, further comprising:
a storage device configured to store the peculiar information and the image associated by the imaging device; and
a retrieval device configured to retrieve, based on the peculiar information, via a network, the image stored in the storage device.

14. An imaging method comprising:
capturing an image via an optical system;
receiving radio wave signals transmitted from a peculiar information transmitter;
acquiring peculiar information included in the radio wave signals;
generating measurement information indicating a position of the peculiar information transmitter with respect to an optical axis center of the optical system based on information of the radio wave signals;
determining, based on the measurement information and an angle of view used for imaging the peculiar information transmitter, whether the peculiar information transmitter is positioned within an imaging range of the optical system; and
performing, when the determining determines that the peculiar information transmitter is located within the imaging range of the optical system, processing for associating the peculiar information and the image.

15. The imaging method according to claim 14, wherein the processing for associating the peculiar information and the image is performed according to the measurement information which is generated based on a radio wave signal or a sound wave signal transmitted by the peculiar information transmitter.

16. The imaging method according to claim 15, wherein the measurement information includes at least a first angle among the first angle formed by a straight line, which passes a reference point present on the optical axis center of the optical system and the peculiar information transmitter, with the optical axis center, a second angle that is an angle of a reference line perpendicular to the optical axis center, which passes the reference point, and a measurement line that projects on a reference plane of the straight line, which passes the reference point and the peculiar information transmitter, and a distance from the reference point to the peculiar information transmitter.

17. The imaging method according to claim 14, wherein, in the performing the processing for associating the peculiar information and the image, processing for associating position information of the peculiar information transmitter in the image captured in the imaging and the peculiar information is further performed based on angle information of the peculiar information transmitter with respect to the optical axis center of the optical system.

18. The imaging method according to claim 14, wherein:
the generating the measurement information comprises generating, as the measurement information, information concerning a first angle of a part from a predetermined position on the optical axis center of the optical system to the peculiar information transmitter with respect to the optical axis center of the optical system and information concerning a second angle between a measurement line, which passes the optical axis center on a plane perpendicular to the optical axis center of the optical system, and a reference line, which passes the optical axis center, and
in the performing the processing for associating the peculiar information and the image, two-dimensional coordinates in the image and the peculiar information are associated based on the measurement information.

19. The imaging method according to claim 14, further comprising outputting, based on a first angle formed by a straight line, which passes a reference point present on the optical axis center of the optical system and the peculiar information transmitter, with the optical axis center and a distance from the reference point to the peculiar information transmitter, information concerning an angle of view at which the peculiar information transmitter is imaged.

* * * * *